(12) United States Patent
Schevardo et al.

(10) Patent No.: US 10,136,498 B2
(45) Date of Patent: Nov. 20, 2018

(54) ACTUATION OF COLOURED LUMINAIRES FOR THE BRIGHTNESS CHANNEL

(71) Applicant: DIEHL AEROSPACE GMBH, Ueberlingen (DE)

(72) Inventors: Dirk-Achim Schevardo, Roethenbach (DE); Marc Renz, Schwabach (DE); Stefan Dobler, Neunkirchen am Brand (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 15/057,425

(22) Filed: Mar. 1, 2016

(65) Prior Publication Data

US 2016/0262223 A1     Sep. 8, 2016

(30) Foreign Application Priority Data

Mar. 3, 2015  (DE) .................. 10 2015 002 639

(51) Int. Cl.
*H05B 33/08* (2006.01)
*B64D 11/00* (2006.01)
(Continued)

(52) U.S. Cl.
CPC ............ *H05B 33/086* (2013.01); *B60Q 3/43* (2017.02); *B60Q 3/80* (2017.02); *B64D 11/00* (2013.01);
(Continued)

(58) Field of Classification Search
CPC .............. H05B 33/086; H05B 33/0863; H05B 33/0815; H05B 33/0827; H05B 33/0845;
(Continued)

(56) References Cited

U.S. PATENT DOCUMENTS 8,258,702 B2 *  9/2012  Zielinski .............. H05B 33/086
                                                           307/10.8
8,922,134 B2   12/2014  Baaijens
(Continued)

FOREIGN PATENT DOCUMENTS

DE     102007055670 A1    6/2009
DE     202009011690 U1    2/2010
(Continued)

*Primary Examiner* — Tung X Le
*Assistant Examiner* — Borna Alaeddini
(74) *Attorney, Agent, or Firm* — Scully Scott Murphy and Presser

(57) ABSTRACT

The present invention is directed to a lighting arrangement having a control input for a control variable and having a luminaire as a multicolored luminaire having an input interface for a color variable and a brightness variable contains a control unit having an output interface for the color variable and the brightness variable, wherein the control unit assigns a brightness value and a color value to a received control value on the basis of a mapping rule.

The present invention is further directed to a vehicle containing such a lighting device and a method for converting a vehicle having a light control infrastructure for connecting luminaires to a control output for a single control variable involves such a lighting device being connected to the control output.

10 Claims, 5 Drawing Sheets

(51) Int. Cl.
  *H05B 37/02* (2006.01)
  *B64F 5/40* (2017.01)
  *B60Q 3/43* (2017.01)
  *B60Q 3/80* (2017.01)
(52) U.S. Cl.
  CPC ............ *B64F 5/40* (2017.01); *H05B 33/0845* (2013.01); *H05B 37/0245* (2013.01); *B64D 2011/0038* (2013.01); *H05B 33/0857* (2013.01)
(58) Field of Classification Search
  CPC ............ H05B 33/0857; H05B 33/0869; H05B 33/0245; H05B 33/0254; B64D 2011/0038; B64D 47/02; B60Q 3/025; B60Q 3/0293
  See application file for complete search history.

(56) References Cited

U.S. PATENT DOCUMENTS

| | | | | |
|---|---|---|---|---|
| 9,018,858 B2 * | 4/2015 | Gambeski | ............ | B64D 47/02 315/112 |
| 9,497,820 B2 * | 11/2016 | Gambeski | ............ | B64D 47/02 |
| 2008/0136334 A1 * | 6/2008 | Robinson | ........... | H05B 37/0254 315/151 |
| 2008/0215279 A1 * | 9/2008 | Salsbury | ............ | H05B 33/0863 702/107 |
| 2009/0021955 A1 * | 1/2009 | Kuang | ............... | H05B 33/0803 362/479 |
| 2011/0309746 A1 * | 12/2011 | Eckel | ..................... | B64D 47/02 315/77 |
| 2012/0019164 A1 * | 1/2012 | Gambeski | ............. | B64D 47/02 315/294 |
| 2012/0126707 A1 | 5/2012 | Kropf | | |
| 2012/0242247 A1 * | 9/2012 | Hartmann | .......... | H05B 33/0863 315/294 |
| 2013/0049633 A1 * | 2/2013 | Wann | ................. | H05B 33/0866 315/294 |
| 2013/0218409 A1 * | 8/2013 | Blain | ................. | B64D 11/0015 701/36 |

FOREIGN PATENT DOCUMENTS

| | | | | |
|---|---|---|---|---|
| DE | 102010043013 A1 * | 4/2012 | ......... | H05B 33/0857 |
| WO | 2011/106661 A1 | 9/2011 | | |

* cited by examiner

ACTUATION OF COLOURED LUMINAIRES FOR THE BRIGHTNESS CHANNEL

BACKGROUND OF THE INVENTION

The invention relates to a lighting arrangement. The lighting arrangement has a control input. This control input is used to transfer or supply a control variable to the lighting arrangement. In this case, the control variable can assume multiple control values. The lighting arrangement has a luminaire that is suitable for producing light. In this case, the light is produced on the basis of the control values. The addressed lighting arrangement is thus actuatable using a single channel.

DISCUSSION OF THE PRIOR ART

Such lighting arrangements are sufficiently well known from many environments, e.g. from interiors of vehicles, that is to say e.g. from the passenger cabin of an aeroplane. In this case, the luminaire is a luminaire for producing monochromatic, essentially white, light. The control variable is a brightness variable. The multiple control values are then different brightness values, e.g. in a range from 0% to 100%. The luminaire then produces light having a brightness according to the brightness variables. The luminaire is switched on—i.e. the luminaire lights at maximum potential brightness—or switched off or dimmed to intermediate brightnesses by supplying the brightness variables.

Often, there is the need to be able to use multicoloured luminaires in such an environment. Multicoloured luminaires produce light in different colours at respectively different brightnesses. They therefore require multiple, at least two, control variables for actuating them, namely e.g. a colour variable, which can assume multiple colour values, in order to control the colour of the light produced by the multicoloured luminaire, and also a brightness variable, which can assume multiple brightness values, in order to control the brightness of the light in the chosen colour that is produced by the multicoloured luminaire.

It is sufficiently well known practice to equip the environment with a multichannel light control system that is routed to each of the multicoloured luminaires in order to supply each of them with the cited control variables (e.g. colour location, brightness, saturation).

Corresponding environments, e.g. aeroplanes, have often contained only single-channel light control systems to date, however. In order to convert the light control system to multiple channels that are normally used for brightness control, it would sometimes be necessary to replace the associated wiring, which means a high level of outlay. Particularly in aeroplanes, not only the hardware but also corresponding software needs to be replaced in this case if the light control system is implemented as a data bus system.

SUMMARY OF THE INVENTION

The present invention is directed to an improved lighting arrangement. The lighting arrangement according to the invention has a control input. This control input is used to transfer or supply a single control variable to the lighting arrangement. In this case, the single control variable can assume multiple control values. The lighting arrangement has a luminaire that is suitable for producing light. In this case, the light is produced on the basis of the control values. The addressed lighting arrangement is thus actuatable using a single channel.

The luminaire of the lighting system according to the invention is a multicoloured luminaire. The multicoloured luminaire has an input interface. The input interface is used to supply a colour variable and a brightness variable. The colour variable can assume multiple colour values, and the brightness variable can assume multiple brightness values. The lighting system additionally contains a control unit. The control unit has the control input and an output interface. The output interface is used to output the colour variables and the brightness variables and is connected to the input interface of the multicoloured luminaire. The control unit is designed to assign both a brightness value and a colour value to a control value received at the control input using a mapping rule and to output them as values for the corresponding variables on the output interface in order to transmit them to the multicoloured luminaire.

The multicoloured luminaire is thus used to produce light in at least two different colours, and at least two different brightnesses in each case, according to the colour value and brightness value on the input interface. The multicoloured luminaire may be any kind of light source for producing such light, e.g. a multicoloured LED or multicoloured LED combination, multicoloured OLED or multicoloured OLED combination, etc. The input and output interfaces may be data interfaces, e.g. bus interfaces for interchanging data, that is to say brightness or colour values. Alternatively, the interfaces may also be e.g. two discrete lines, however, in order to transmit colour and brightness values in digital or analogue fashion via the respective line. By way of example, the colour value is a value triple, e.g. an RGB (Red, Green, Blue) or YUV (colour saturation Y and colour location U, V) value.

The control unit particularly forms a dedicated adapter module, which is separate or integrated in the luminaire, for the multicoloured luminaire, which adapter module is connected between the multicoloured luminaire and the control input or a component that supplies to the control input, for example a control output of a light control system. The control input too may, as above, be a data interface or an input for one or more discrete lines. By way of example, two lines that form the control input and are each operated as a one-bit binary line (supply voltage applied/no voltage applied) can be used to transmit a total of four control values of the control variables in binary fashion.

The invention is based on the following considerations: luminaires for producing exclusively monochromatic, particularly white, light, what are known as monochromatic luminaires, require just a single brightness control or brightness channel in order to actuate them completely. In addition to the brightness information, multicoloured luminaires require a piece of colour information when they are actuated. The colour information is e.g. a value triple for RGB colour components or for colour saturation and colour location in a colour space. If colour luminaires are now intended to be used in an environment that contains only a light controller for the brightness of a monochromatic luminaire, such as in earlier vehicle cabins, for example, then although the brightness of a multicoloured luminaire can likewise be controlled when a multicoloured luminaire is used, it is not possible to alter or control the colour. This needs to be permanently set e.g. on the luminaire. The controller can then be used to alter just the brightness of the multicoloured luminaire again.

By contrast, the invention allows a multicoloured luminaire to continue to be actuated using the existing hardware by means of a single control variable, but respective control values that are present are mapped onto respective value pairs comprising a determined brightness value and a determined colour value using a mapping rule. The corresponding association can be made totally arbitrarily in this case. As a result, depending on the number of available control values, the same number of colour/brightness value pairs is available in order to be able to operate the multicoloured luminaire in many variants using different colours and brightnesses.

In this case, the mapping rule can be designed arbitrarily. The mapping rule can therefore be provided with desired combinations of colour and brightness for the multicoloured luminaire. Choosing the control value selects the desired colour/brightness combination.

According to the invention, the use of single-channel actuation, which is intended e.g. for a monochromatic, particularly white, luminaire, means that an at least two-coloured luminaire is actuatable, so that—at least within certain limits—the colour and brightness thereof is controllable.

It is advantageous that, despite the extensive possibilities for colour and brightness design, the lighting arrangement can be connected to any light control infrastructure that provides just a single control variable at respective connection locations for lighting arrangements.

According to one preferred embodiment of the invention, the mapping rule contains a control curve. According to the control curve, each control value is assigned a pair of values comprising brightness value and colour value.

The control unit is then designed to assign a brightness value and a colour value to the control value at least using a control curve or on the basis of the control curve. The control curve may be stored, particularly in the lighting arrangement, in the form of a table or file, for example. At least part of the mapping rule therefore consists in assigning a brightness value and a colour value, as a respective value pair, to a respective control value on the basis of the control curve. In this case, the curve association is totally unrestricted, that is to say that two different control values can each have arbitrary different or like brightness and colour values associated with them. Owing to the control curve, there is a basic association between the respective control values and determined value pairs of brightness and colour values.

In a preferred variant of this embodiment, the control curve contains at least one first section or range of control values, in which section or range all control values that the section contains each have the same associated colour value, but different associated brightness values. That is to say that, in the section, brightness values are assigned to the control values on the basis of the control value while the colour value is the same or constant. The variation of the control value in such a first section allows light of constant colour to be dimmed.

Additionally or alternatively, the control curve contains a second section or range of control values, in which section or range all control values that the section contains each have the same associated brightness value, but different associated colour values. That is to say that, in the section, colour values are assigned to the control values on the basis of the control value while the brightness value is the same or constant. The variation of the control value in such a second section allows light at constant brightness to have its colour altered.

In one preferred embodiment of the invention, the control unit contains a decoding unit. This is designed to decode a control command from a series of control values that arrives at the control input. In this case, the series of control values has a coding pattern for the control command. The control unit is designed to output colour and brightness values on the output interface. In this case, it produces the colour and brightness values according to an algorithm associated with the control command. In this case, the algorithm can use or contain particularly the mapping rule, particularly the control curve. In this case, the algorithm also determines the chronological order of the value pairs of colour and brightness value that are to be output. This chronological order may be either dependent on the chronological order of the control values arriving at the control input or independent of the chronological order thereof.

According to this embodiment, the advantage arises that further design options for the choice of colour/brightness are revealed regardless of or in addition to the mapping rule. By way of example, a control command can thus initiate brightness and/or colour transitions in the form of the algorithm that go beyond the possibilities of the mapping rule. Such algorithms are e.g. programmes or time profiles for brightness and colour stored in a lighting system. Depending on the complexity of the coding pattern, it is preferable, in principle, to define any number of control commands and therefore also to store any number of algorithms in the lighting system.

In a preferred variant of this embodiment, the coding pattern is of a nature such that it describes a determined chronological order for control values. The control command is thus coded such that control values are transmitted to the lighting device in a prescribed chronological order. The actual values of the control values are of no importance in this case.

In alternative or additional variants, the coding pattern may also be of a nature such that it describes a series of determined control values. The control command is thus coded such that determined control values, i.e. those having a determined magnitude, are transmitted to the lighting device in succession. The chronological order of the values is of no importance in this case.

The two variants can also be combined. The control command is then coded by means of determined control values arriving at the control input in a determined chronological order.

According to a further preferred embodiment, the control values are discrete values, wherein the discrete values have a first value resolution. Alternatively or additionally, the control values arrive at the control input at a maximum first temporal resolution. The control unit contains an interpolator. This is designed to assign brightness values and/or colour values to the control values arriving at the control input, wherein the brightness and/or colour values have a finer second temporal resolution and/or a finer second value resolution.

An internal finer second temporal resolution and/or a finer second value resolution mean(s) that the multicoloured luminaire always has finer graduations and a finer timing system available for brightness and colour values. Thus, the multicoloured luminaire can be operated in flicker-free fashion, for example, when changing values are transmitted to it at a minimum frequency that is no longer resoluble for the human eye. Such frequencies are e.g. at least 50, 60, 85, 100 or 200 Hz. It is also possible for brightnesses and colour changes to be provided with such fine graduation that differences between two different brightness or colour values are no longer perceptible to the human eye. By way of example, between two colour values, the colour locations in the colour space, e.g. CIE 1931, are altered only by no more than 1 or 2 SDCMs (Standard Deviations of Colour Matching). In particular, by way of example, a 7-bit control variable with 128 control values is internally interpolated onto a 16-bit brightness variable and 16-bit colour variable with 65536 brightness and colour values each.

In a further preferred embodiment, the lighting arrangement is a lighting arrangement for an interior of a vehicle. The interior is particularly a passenger cabin, and the vehicle is particularly an aircraft. The invention is particularly useful in such environments, since existing single-channel light control infrastructures can be used for multicoloured luminaires. Particularly when luminaires for monochromatic light are converted to multicoloured luminaires, it is thus not necessary to replace the infrastructure, and it is still possible for colour and brightness to be chosen freely—within certain limits—in the case of multicoloured luminaires.

The present invention is also directed to a vehicle, particularly an aircraft, containing a lighting device according to the invention. Therefore, the advantages cited in connection with the lighting device are obtained mutatis mutandis for the vehicle.

In one preferred embodiment, the vehicle has a light control infrastructure that is used to actuate a luminaire of a vehicle lighting system, particularly of an interior lighting system. The light control infrastructure contains at least one control output, wherein at least one luminaire can be connected to each of the control outputs. The infrastructure is designed to output a single control variable at a respective control output, the control variable being able to assume multiple control values. A lighting device according to the invention then has its control input connected to one of the control outputs.

This results in the advantage that multicoloured luminaires can be operated in a vehicle having a single-channel infrastructure with an extremely free choice of light colour and light brightness.

In respect of the method for converting a vehicle, particularly an aircraft, the vehicle has a light control infrastructure that is used to actuate a luminaire of a lighting system of the vehicle, particularly an interior lighting system of the vehicle. The infrastructure contains at least one, particularly multiple, control output(s). At least one of the luminaires can be connected to each of the control outputs. The infrastructure outputs a single control variable at a respective control output. In this case, the control variable can assume multiple different control values. When the vehicle is converted, at least one lighting device according to the invention is connected to at least one of the control outputs. In particular, at least one lighting device according to the invention at a time is connected to all control outputs.

The conversion according to the invention allows multicoloured luminaires to be upgraded in a vehicle that has only a single-channel infrastructure for actuating luminaires.

In one preferred embodiment of the method, the control outputs have at least one monochromatic luminaire, that is to say one for exclusively producing monochromatic light, connected to them prior to the conversion, the brightness of the light being adjusted according to the control variable. During the conversion, at least one of the monochromatic luminaires, preferably multiple, preferably all, are replaced by the lighting devices according to the invention.

In this method variant, vehicles having previous monochromatic lighting can be upgraded with multicoloured lighting.

In summary, the invention thus involves an adapter module—particularly in the form of a control unit—being connected between a control input or a control line routed to the luminaire and a luminaire. A control value is transmitted to the lighting arrangement—e.g. via the signal line. In the adapter module, a brightness value and a colour value are assigned to the received control value on the basis of the mapping rule. Brightness value and colour value are transmitted to the multicoloured luminaire. The multicoloured luminaire produces light in a colour according to the colour value and at a brightness according to the brightness value.

BRIEF DESCRIPTION OF THE DRAWINGS

Further features, effects and advantages of the invention will emerge from the description of a preferred exemplary embodiment of the invention below and the appended figures, in which, in a schematic basic outline.

DETAILED DESCRIPTION OF THE DRAWINGS

Figure 1:
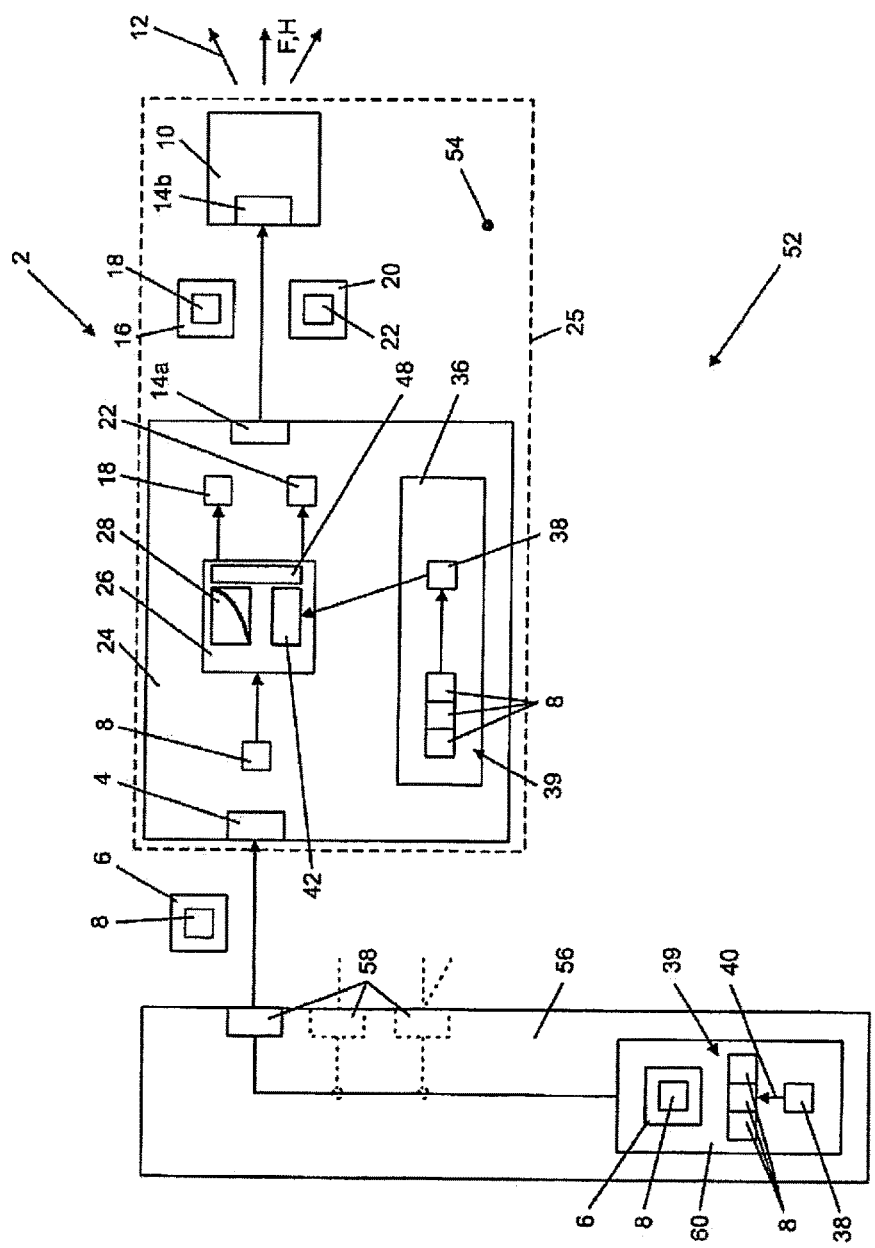
FIG. 1 shows a detail from an aeroplane having a lighting arrangement according to the invention for its passenger cabin.

FIG. 1 shows a lighting arrangement 2 that has a control input 4. At the control input 4, the lighting arrangement 2 receives a control variable 6 that can assume multiple control values 8. The lighting arrangement 2 additionally comprises a luminaire 10. The luminaire 10 produces light 12 on the basis of the control values 8. The luminaire 10 is a multicoloured luminaire, in the example a three-LED RGB luminaire (LED: light-emitting diode, RGB: Red/Green/Blue). This has an input interface 14b. At the input interface 14b, the luminaire 10 receives a colour variable 16 that can assume multiple colour values 18. Furthermore, it receives a brightness variable 20 that can assume multiple brightness values 22. The light 12 produced has a colour F according to the colour value 18 and a brightness H according to the brightness value 22.

The lighting arrangement 2 additionally has a control unit 24 that contains the control input 4 and also an output interface 14a. In the example, the control unit 24 is a microcontroller. The output interface 14a is connected to the input interface 14b and is used to output the colour variable 16 and the brightness variable 20 and transmit them to the luminaire 10. The control unit 24 is designed to map the control value 8 received at the control input 4 onto the brightness value 22 and the colour value 18. This is done on the basis of a mapping rule 26.

During operation, the lighting arrangement 2 thus receives a control value 8, and the control unit 24 maps the control value 8 onto a colour value 18 and a brightness value 22 according to the mapping rule 26. These values are transmitted to the luminaire 10, which then emits light 12. The light 12 has a colour F characterized by the colour value 18 and a brightness H characterized by the brightness value 22.

The control unit 24 thus forms an adapter module for the luminaire 10, which adapter module may be connected upstream of the luminaire 10 separately that is to say dedicated (sub)unit. Alternatively—as indicated in dashes in FIG. 1—the adapter module is integrated in the luminaire 10 and forms a modified luminaire or a luminaire module 25 therewith.

The mapping rule 26 contains a control curve 28. The control curve 28 assigns a respective value pair comprising a brightness value 22 and a colour value 18 to every possible control value 8.

FIG. 1 shows the lighting arrangement 2 as part of a vehicle 52, in this case an aircraft in the form of an aeroplane. The vehicle 52 has an interior 54, in this case in the form of a passenger cabin. The lighting arrangement 2 is used to light the interior 54 with light 12.

In order to actuate the lighting arrangement 2, the vehicle 52 contains a light control infrastructure 56. The light control infrastructure 56 contains multiple (indicated in dashes in FIG. 1) control outputs 58, wherein one or more lighting arrangements 2 have their respective control input 4 connected to each of these control outputs 58. At each of the control outputs 58, the light control infrastructure 56 provides the control variable 6 in order to supply it to the respective control input 4. The light control infrastructure 56 contains an operator control unit 60 according to which the control variable 6 is chosen or altered to assume various control values 8. By way of example, the choice of control value 8 is made manually by vehicle personnel or by a lighting module—not shown—or the programme flow controller thereof.

In the light control infrastructure 56, there is the opportunity to use the control variables 6 to send different control commands 38 to the control unit 24. To this end, a determined series 39 of control values 8 is produced according to a determined coding pattern 40 (indicated by an arrow in FIG. 1) associated with the control command 38. In this case, the coding pattern 40 determines the chronological order and/or the order of determined values of the control values 8 in the series 39.

To receive the control commands 38, the control unit 24 contains a decoding unit 36. The decoding unit 36 monitors the control values 8 arriving at the control input 4 for their chronological order and for the order of their magnitude or values and checks these for the occurrence of one of the stipulated series 39. If the decoding unit recognizes one of the series 39 coded by the defined control commands 38 or the occurrence of the associated coding pattern 40, it decodes or recognizes the control command 38 therefrom.

For each of the control commands 38, the control unit 24 contains an algorithm 42. In this case, the algorithm 42 is part of the mapping rule 26 and produces colour and brightness values 18, 22 on the basis of the control command 38. In this case, the mapping rule 26 also produces chronological orders for multiple value pairs of colour and brightness values 18, 22, which do not necessarily have to be dependent on the control value 8 currently applied to the control input 4, and forwards them to the luminaire 10 under time control.

The control unit 24 additionally contains an interpolator 48. This is used to produce or interpolate intermediate values for the colour value 18 and/or the brightness value 22, in respect of timing and/or in respect of the values thereof, between the instances of application of two successive control values 8 to the control input 4.

FIG. 1 shows a converted vehicle 52. Prior to the conversion, the vehicle was equipped with luminaires 10 for producing monochromatic light. In this case, the control value 8 prescribed just the brightness H of the light produced. In other words, the luminaires were dimmed between the "Off" and "100% brightness" states on the basis of the control value. In this case, the control value is thus used as a "dimming value". During the conversion, the previous luminaires 10 were removed from the control outputs 58 and replaced with the luminaires 10 according to the invention for producing light in different colours F and at different brightnesses H.

Figure 2:
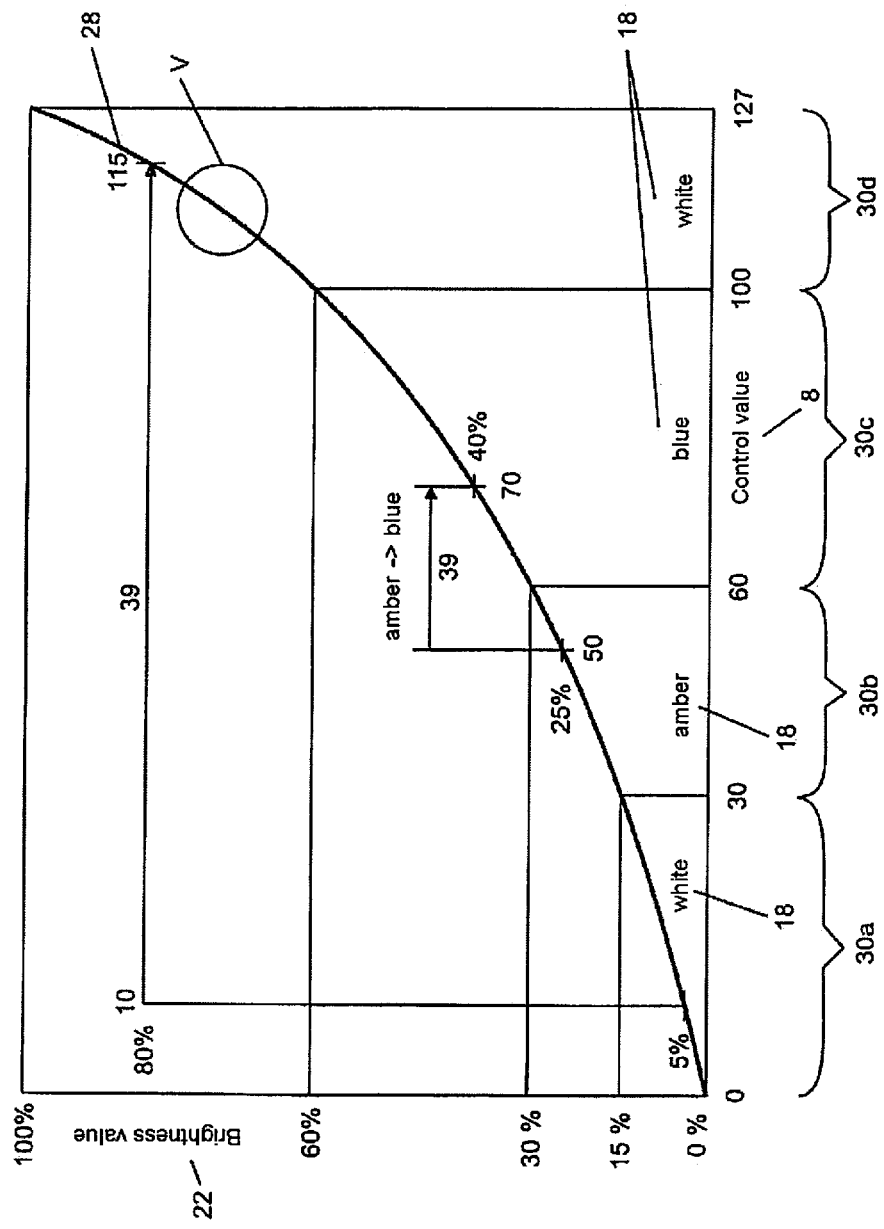
FIG. 2 shows the control curve from FIG. 1 in detail with outlined transitions between control values.

FIG. 2 shows the control curve 28 from FIG. 1 in detail. The abscissa has the control value 8 plotted on it, which is a 7-bit digital value in the example and can assume values from "0" to "127". For the sake of simplicity, the control curve 28 is shown not in the form 128 of discrete value points, however, but rather in solid form. The ordinate has the brightness value 22 plotted on it, which can assume values between "0%" and "100%" in the example. At a "0%" brightness value 22, the luminaire 10 produces no light, at a "100%" brightness value 22, the luminaire 10 produces light 12 at the maximum brightness H that it can present for the current colour F. The respective colour value 18 that is assigned to every possible control value 8 is shown by words for the colours "white", "amber" and "blue" in FIG. 2. The words are representative of corresponding value triples RGB (Red, Green, Blue) for mixing the relevant shade from determined components of the primary colours red, green and blue.

The control curve 28 has a total of four first sections 30a-d. In each of the first sections 30a-d, each control value 8 that it contains is assigned the same colour value 18 each time, but brightness values 22 that are dependent on the control value 8. Thus, e.g. in the first section 30a, all control values 8 "0"-"30" are assigned the same colour value 18 "white". By contrast, each of the control values 8 "0"-"30" is assigned a different brightness value 22 between "0%" and "15%" according to the control curve 28. The control values 8 "31"-"60" in the first section 30b are assigned the colour value 18 "Amber" each time, but different brightness values 22 between "15%" and "30%" according to the control curve 28.

FIG. 2 also contains two examples of control command 38. The coding pattern 40 of a first control command 38 consists in applying a series 39 of continuously successive control values 8 (in FIG. 2 the values "50" to "70") to the control input 4 in a determined chronological order, namely at "dimming rate". That is to say that the defined values must follow one another within intervals of time that cannot exceed a maximum limit. By way of example, the entire dimming process must be complete after a maximum time, e.g. 1, 2, 5 or 10 seconds. Alternatively, two single control values 8 must follow one another within a maximum time of e.g. 500, 250, 100 or 10 ms.

In this case, the control command 38 means that the algorithm 42 produces a gradual or smooth colour profile from the assigned colour value 18 of the first control value 8 "50" in the series 39, in this case "amber", through to the colour value 18 of the last control value 8 "70", in this case "blue", the brightness values 22 likewise being altered from the initial brightness value 22 "25%" to the last brightness value 22 "40%" in a series 39 according to the control curve 28.

FIG. 2 contains a further example of a control command 38. The associated coding pattern 40 consists in the control value 8 being abruptly altered from a first value (in this case "10") to a second value (in this case "115"), the two values needing to have the same associated colour value 18 (in this case "white"). "Abruptly" means that the control values 8 are applied to the control input 4 without intermediate values and within a determined maximum time, for example within 1 s, 500 ms, 250 ms or 100 ms. This control command 38 is used for the brightness transition at constant colour value 18 (in this case "white"). The algorithm 42 produces a—in comparison with the application of the two control values 8—comparatively slow series of brightness values 22, for example with a total duration of 3, 5, 10, 15 or 20 seconds, which rise from the first brightness value 22 (in this case "5%") to the second brightness value 22 (in this case "80%"), without altering the colour value 18 "white". In other words, the corresponding brightness transition involves the colour changes to "amber" and "blue" being avoided or skipped in the control curve 28, and just light of constant colour, in this case white, being dimmed more brightly.

A further example—not shown—of a control command 38 would be to apply a series of determined values of control values 8 to the control input 4, for example, without timings being crucial in this case. By way of example, the application of the series of values 39 "0-64-127-64-0" leads to a control command 38 or a "demo mode". In this demo mode, the algorithm 42 produces, for a prescribed time or until a further control command 38 is sent, different brightness values 22 each time comparatively slow or gentle complete spectral passes through all possible colour values 18 for the luminaire 10, in order to demonstrate the full colour capabilities of the lighting arrangement 2.

Figure 3:
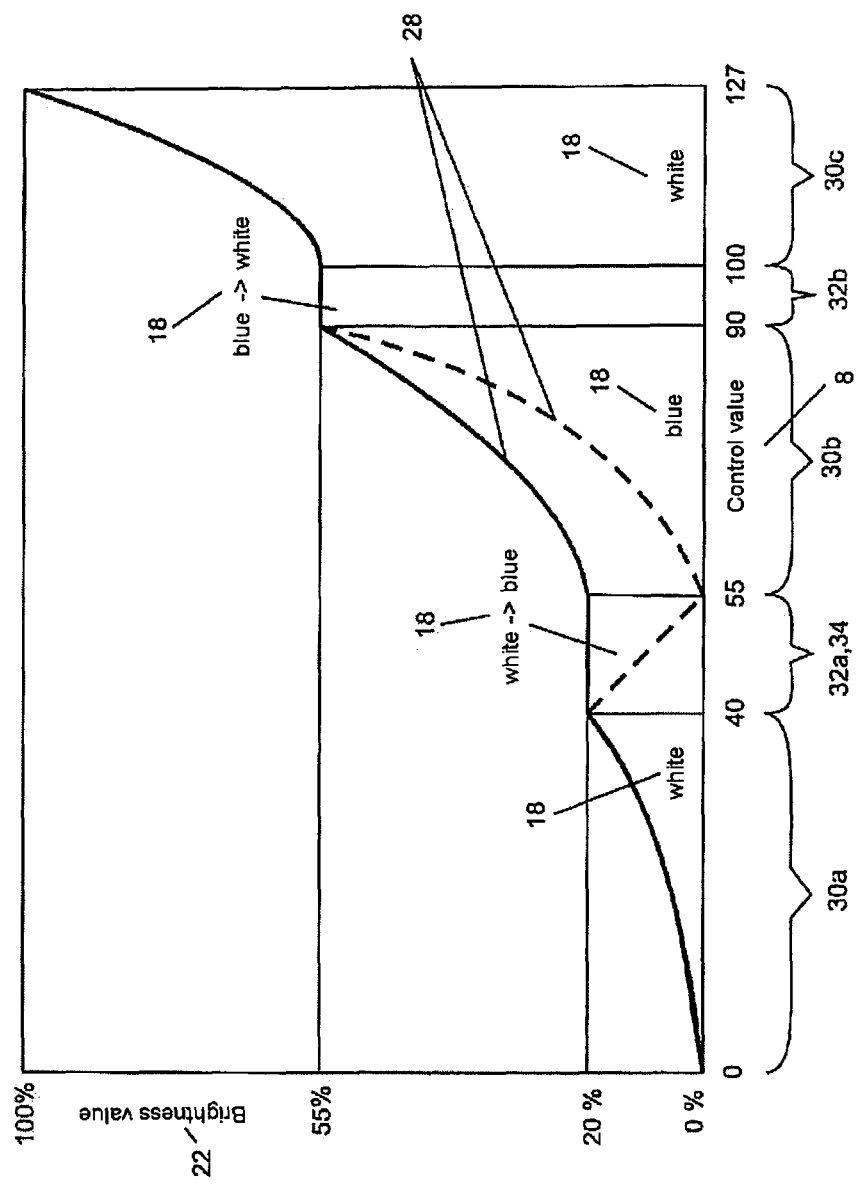
FIG. 3 shows alternative control curves with sections for colour transitions.

FIG. 3 shows an alternative control curve 28 in a solid representation. This control curve has three first sections 30a-c corresponding to those in FIG. 2, that is to say in which the control values 8 are each assigned constant colour values 18 "white" or "blue" for variable brightness values 22 between "0%-20%", "20%-55%" and "55%-100%".

The control curve 28 also has two second sections 32a, b. In these sections, all of the control values 8 that they contain are assigned the same respective brightness value 22, namely "20%" and "55%", but different colour values 18. Thus, in the second section 32a, the control values 8 "41-55" are each assigned different colour values 18 that change gradually from "white" to "blue". The corresponding colour values are those that are situated on a connecting line between the colour locations "white" and "blue" in a colour space CIE 1931, which is not shown. The same applies to the second section 32b, in which all of the control values 8 "91-100" are assigned colour values 18 that gradually progress from the colour value 18 "blue" to the colour value 18 "white".

FIG. 3 shows a further alternative control curve 28 in dashes. This has the special feature of a third section 34 in which, for control values 8 "41-45", the colour values 18 change gradually from "white" to "blue" in the manner identical to the second section 32a, but the brightness values 22 also decrease from "20%" to "0%" according to the control curve 28.

Figure 4:
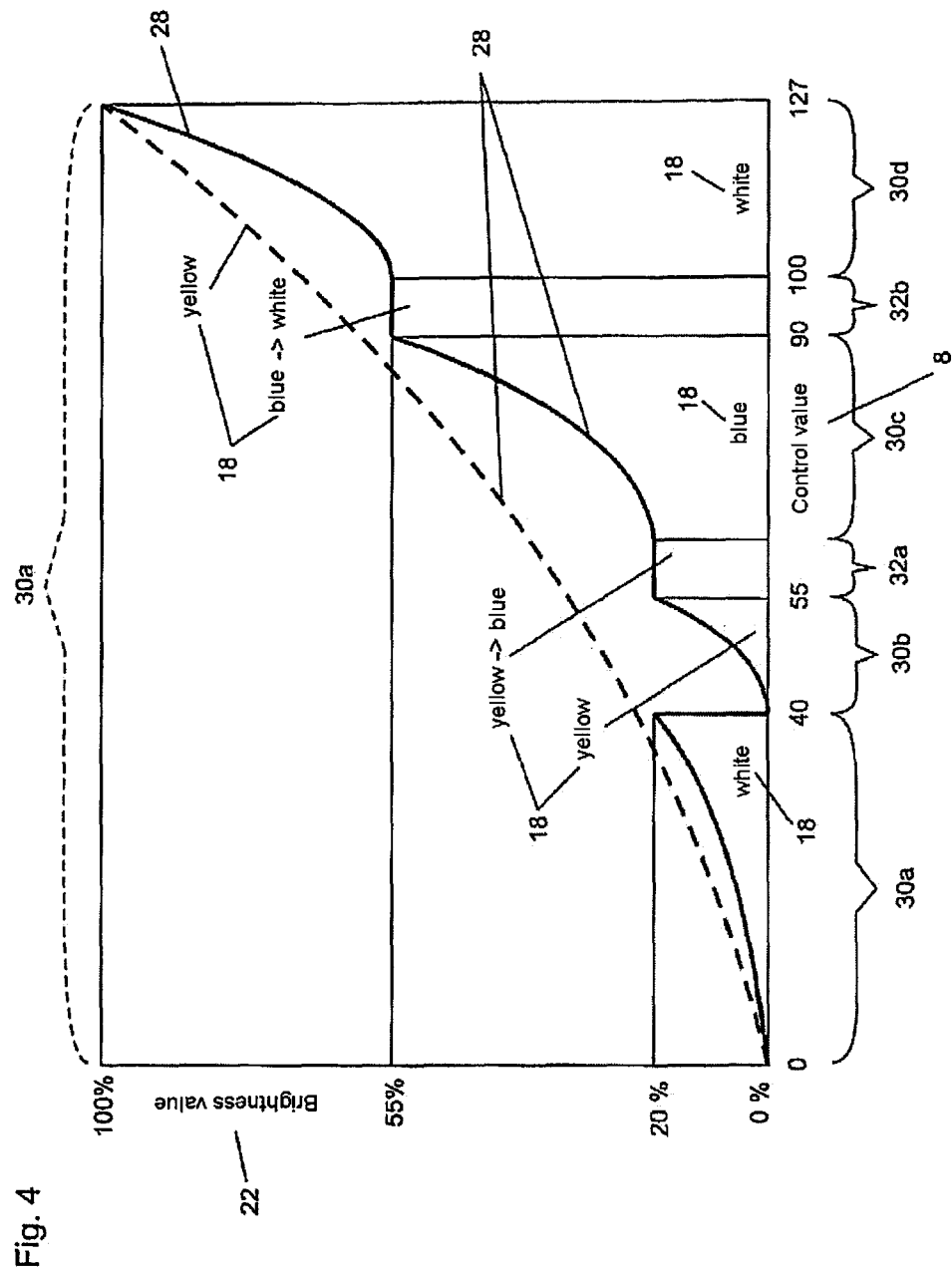
FIG. 4 shows an alternative control curve with sections for colour transitions and a monochromic control curve.

FIG. 4 shows a further alternative control curve 28 in solid form. This again has, in accordance with FIG. 2 and FIG. 3, four first sections 30a-d with the respective constant colour values 18 "white", "yellow" and "blue" for brightness values 22 that vary in each case. In two second sections 32a, b, FIG. 3 again shows that the control values 8 are assigned variable colour values 18 (from "yellow" to "blue" and from "blue" to "white") for constant brightness values 22.

A further alternative control curve 28 is shown in dashes and has a single section 30a in which all the possible control values 8 from "0" to "127" are assigned the same colour value 18 "yellow" for variable brightness values 22 from "0%" to "100%".

Figure 5:
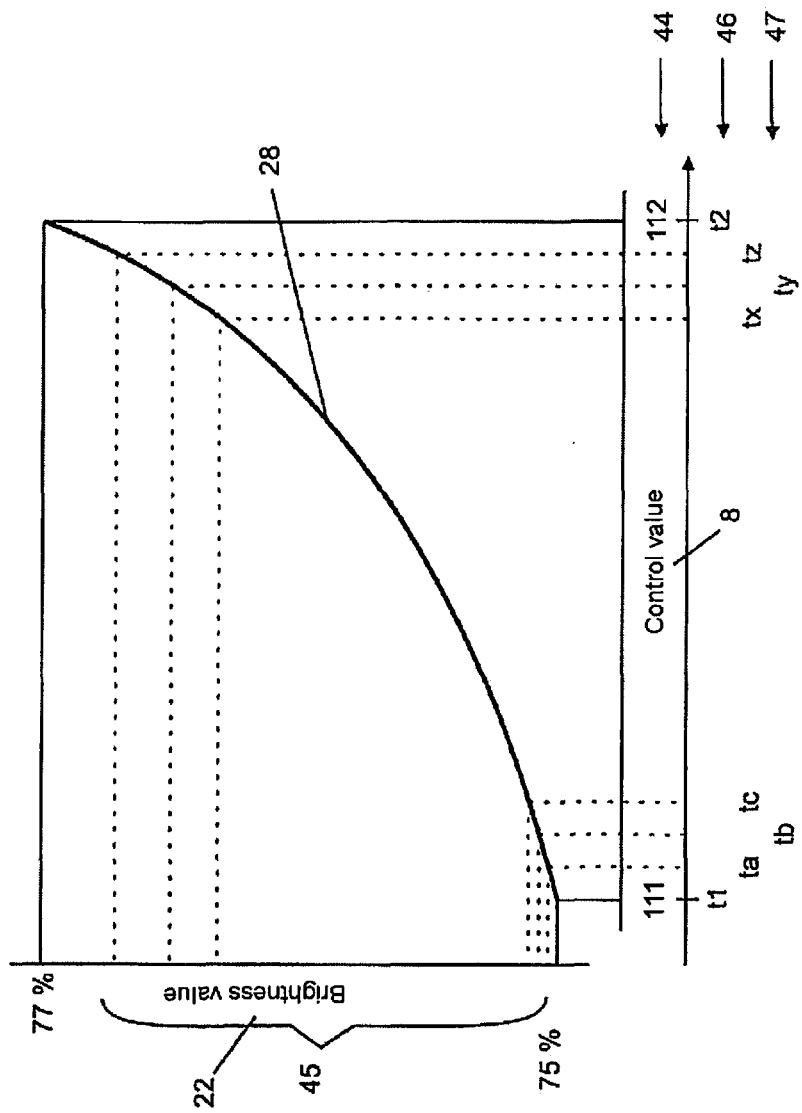
FIG. 5 shows the detail V from FIG. 2.

FIG. 5 shows the detail V from FIG. 2 in order to illustrate a further property of the lighting arrangement 2. The control values 8 have a first value resolution 44, since they can assume only 128 values. On account of the limited number of just 128 control values 8, alteration of the brightness value 22 from "75%" to "77%" between the two control values 8 "111" and "112" is clearly perceptible to an observer—not shown—as a change in the brightness H in the light 12. In other words, the resolution for brightness values 22 is insufficient to bring about brightness transitions that are imperceptible to an observer. The same also applies to colour transitions in a manner that is not shown.

There is also a time limit for the transmission of the control values 8 to the control input 4. The control values 8 can be transmitted to the control input 4 by the light control infrastructure 56 only at an extremely short interval of time of e.g. 20 ms between times t2=t1. In this case, there is thus a first temporal resolution 46.

The interpolator 48 therefore produces intermediate values, in respect of timing, for the colour value at the times ta to tz with t1<ta< . . . <tz<t2 at an increased second temporal resolution 47. At each of these times ta to tz, the interpolator 48 interpolates intermediate values for the control value 8 along the control curve 28 and assigns brightness values 22 to these intermediate values on the basis of the control curve 28 (dashed lines in FIG. 5). Thus, a finer second value resolution 45 is produced for the output brightness values 22, which are output on the output interface 14a at the finer second temporal resolution 47 in order to actuate the luminaire 10 with a "gentle" brightness transition that the observer perceives as smooth.

LIST OF REFERENCE SYMBOLS

2 Lighting arrangement
4 Control input
6 Control variable
8 Control value
10 Luminaire
12 Light
14a Output interface
14b Input interface
16 Colour variable
18 Colour value
20 Brightness variable
22 Brightness value
24 Control unit
25 Luminaire module
26 Mapping rule
28 Control curve
30a-d First section
32a, b Second section
34 Third section
36 Decoding unit
38 Control command
39 Series
40 Coding pattern
42 Algorithm
44 First value resolution
45 Second value resolution
46 First temporal resolution
47 Second temporal resolution
48 Interpolator
52 Vehicle
54 Interior
56 Light control infrastructure
58 Control output
60 Operator control unit
F Colour
H Brightness
t Time

The invention claimed is:

1. A vehicle, comprising:
a lighting arrangement for providing light to an interior of the vehicle; and
a light control infrastructure for actuating the lighting arrangement,
wherein the lighting arrangement comprises:
a control input for inputting a single control variable that assumes multiple control values, and
a multicoloured luminaire for producing light on the basis of the multiple control values,
wherein the multicoloured luminaire comprises an input interface for supplying a single colour variable and a brightness variable, wherein the single colour variable assumes multiple colour values, and wherein the brightness variable assumes multiple brightness values,
wherein the lighting arrangement further comprises a control unit, the control unit comprising the control input and an output interface for the single colour variable and the brightness variable, the output interface being connected to the input interface,
wherein the control unit is configured to assign a brightness value and a colour value to a control value received at the control input using a mapping rule and to output the assigned brightness value and colour value to the output interface, and
wherein the control unit forms a dedicated adapter module for the multicoloured luminaire, such that the adapter module and the luminaire together form a modified luminaire module, wherein the dedicated adapter module is separated from or integrated into the luminaire; and
wherein the light control infrastructure comprises:
a plurality of control outputs, wherein each of the plurality of control outputs is configured to output a respective single control variable that assumes respective multiple control values,
wherein the control input of the lighting arrangement is connectable to each of the plurality of control outputs of the light control infrastructure, such that the single control variable is provided from the light control infrastructure to the lighting arrangement, and
wherein the light control infrastructure further comprises an operator control unit for selecting or altering the single control variable to assume the multiple control values.

2. The vehicle according to claim 1, wherein the mapping rule comprises a control curve according to which each control value has an associated pair of values comprising a brightness value and a colour value.

3. The vehicle according to claim 2, wherein
the control curve comprises at least one first section of control values, in which section all control values have the same associated colour value and each control value has an associated brightness value that is dependent thereon,
and/or the control curve comprises at least one second section of control values, in which section all control values have the same associated brightness value and each control value has an associated colour value that is dependent thereon.

4. The vehicle according to claim 1, wherein
the control unit comprises a decoding unit that is configured to decode the control command from a series of control values that arrives at the control input and that has a coding pattern for a control command, and
the control unit is configured to produce colour values and brightness values according to an algorithm associated with the control command and to output the produced colour values and brightness values to the output interface.

5. The vehicle according to claim 4, wherein
the coding pattern describes a determined chronological order for control values,
and/or the coding pattern describes a series of determined control values.

6. The vehicle according to claim 1, wherein
the control values are discrete values having a first value resolution, and/or the control values are applicable to the control input at a maximum first temporal resolution,
the control unit comprises an interpolator that is configured to assign brightness values and/or colour values having a finer second temporal resolution and/or having a finer second value resolution to the control values received at the control input.

7. The vehicle according to claim 1, wherein the lighting arrangement is for a passenger cabin of an aircraft.

8. A method for converting a vehicle that has a light control infrastructure that is used to actuate a luminaire of a vehicle lighting system and that comprises at least one control output to which at least one of the luminaires can be connected, wherein the light control infrastructure outputs a single control variable, which can assume multiple control values, at a respective control output,
the conversion comprising connecting the control input of at least one lighting device according to claim 1 to at least one of the control outputs.

9. The method according to claim 8, wherein
the conversion is implemented by connecting luminaires for exclusively producing monochromatic light, whose brightness is adjusted according to the control variable, being connected to the control output, wherein
the conversion involves at least one of the luminaires being replaced by the lighting device.

10. The method according to claim 8, wherein said vehicle is an aircraft and said vehicle lighting system is an interior lighting system.

* * * * *